UNITED STATES PATENT OFFICE.

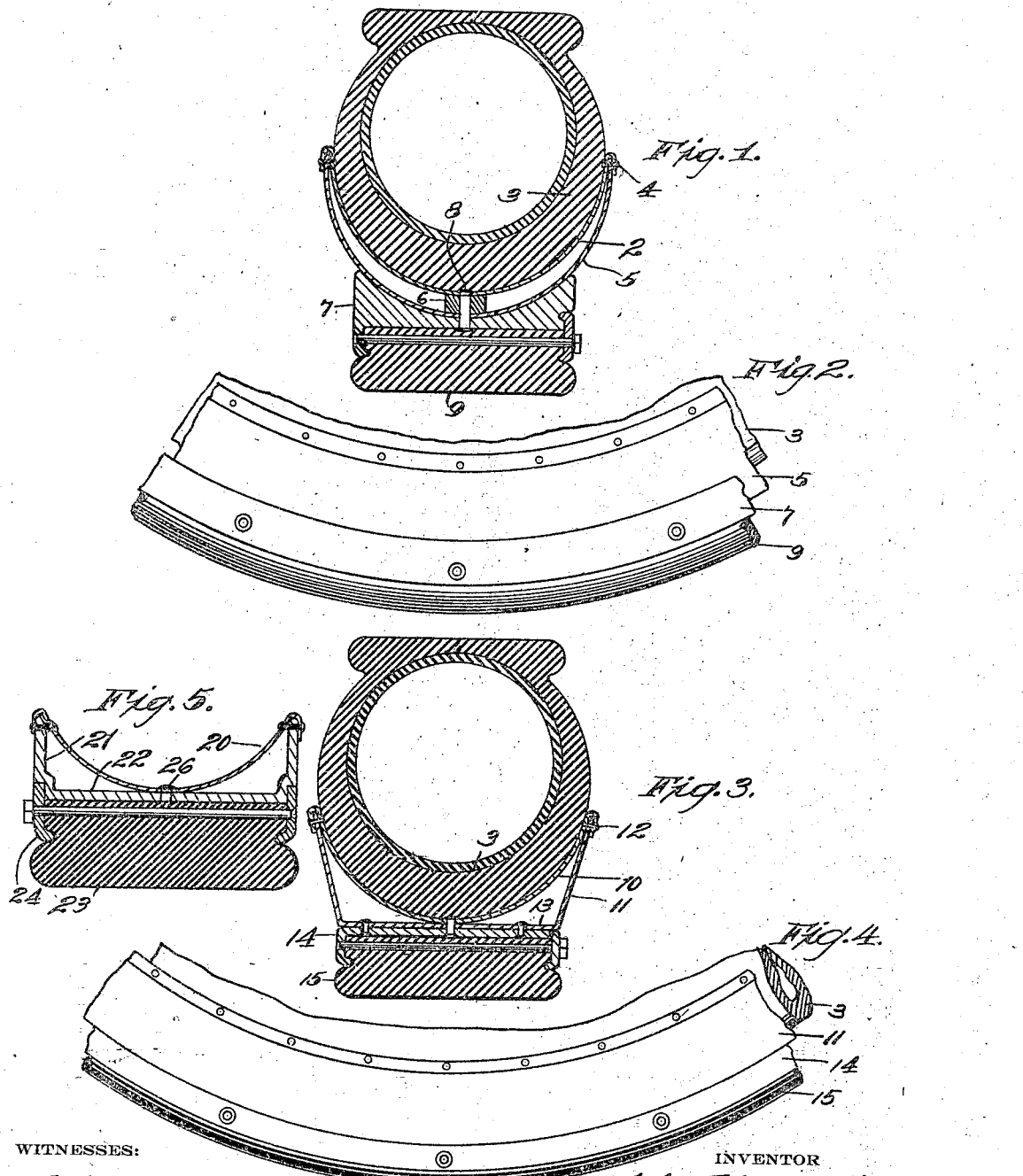

JOHN F. GEISENDORFER, OF WEIMAR, CALIFORNIA.

ARMOR FOR AUTOMOBILE-TIRES.

1,127,878.             Specification of Letters Patent.        Patented Feb. 9, 1915.

Application filed September 8, 1913. Serial No. 788,723.

*To all whom it may concern:*

Be it known that I, JOHN F. GEISENDORFER, a citizen of the United States, residing at Weimar, in the county of Placer and State of California, have invented new and useful Improvements in Armor for Automobile-Tires, of which the following is a specification.

This invention relates to means for protecting automobile tires, and particularly pneumatic tires, against puncture and wear.

The object of the present invention is to provide an armor for automobile tires which will protect the same against wearing contact with the roadway, thus increasing the life of the tire and also eliminating the possibility of puncture.

The invention consists of an inner thin concavo-convex rim or shell, preferably of metal, conforming to the usual wearing surface or tread of a tire, and further of an outer shell or support on which is mounted a band or rim for carrying a soft tread which may be of rubber.

The invention further consists of the parts and the construction and combination of parts as hereinafter more fully described and claimed, having reference to the accompanying drawings, in which,—

Figure 1 is a cross section of one form of the invention. Fig. 2 is a side elevation of a fragment thereof. Fig. 3 is a cross section of a modified form of the invention. Fig. 4 is a side elevation of a fragment thereof.

In that form of my invention shown in Fig. 1, 2 is a thin annular shell or casing circumferentially fitting the convex surface of an automobile tire, as 3, and to the lateral edges of the shell 2, riveted or otherwise secured, as at 4, are the contiguous edges of an outer annular convexed part 5, which may be spaced from the convex surface of the shell 2 which fits the tire thereof. In Fig. 1 the parts 2 and 5 are so spaced as to form a crescent-shaped space in cross section, in which is centrally mounted an annular ring or spacing member 6 for spacing and supporting the parts 2 and 5, and circumferentially fitting upon the outer surface of the protector part 5, is a band or rim 7, the parts 7—6—5 and 2 being rigidly secured by rivets, or other suitable means 8. Upon the rim or band 5 there may be mounted and held a cushion tread of rubber 9.

From the foregoing it will be seen that when the tire 3 is deflated, the casing member 2 with its attached elements may be readily mounted upon the tire 3. Upon inflating the tire, the attachment will be frictionally held in place thereon. During the running of the wheel on which may be mounted the cushion surface or tread 9 the wear will occur on said cushion surface; the load of the wheel being transmitted to the surface through the associated shell members 2 and 5 and the supporting rim or band 7.

In Figs. 3 and 4 I have shown a slightly modified form of the invention in which the tire fitting rim 10 is substantially covered or incased in the protecting shell 11; these parts being secured, edge to edge, by rivets 12, while the protecting part 11 has a flattened peripheral surface 13 upon which is mounted the band 14, this in turn supporting the cushion tread 15. The band 14 and the protecting member 13, with the tire fitting shell 10, are all rigidly secured by rivets 16.

By providing a casing or member 10 adapted to snugly fit upon the tire and a casing or member protected against direct surface wear by the outer shell or protector 11, it will be seen that the inner shell 10 may be made of light, substantial material, and the protecting shell in turn is protected against direct wearing contact with the roadway by the cushion tread 15, in one instance, and 9 in the other case; these treads being respectively carried upon a substantial band or support, as 7, and 14, in the different modifications; the greater part of the stress of operation being taken up by the heavier bands, and through these distributed to the thin shell-like members of the tire protector.

The function of the shells or thin metallic rings is to protect the sides of the tire from laceration and puncture, and also to distribute the pressure, due to the encountering of obstacles and unevenness of the roadway, throughout a large portion of the tire.

It is understood that the armor is placed on the tire when the latter is deflated and held in place by the inflation of the tire; the ring 5 constituting a supporting and strengthening key to the arch of the transverse section of the armor.

In Fig. 5 there is shown a slight modification in which the tire is embraced by the shell 20 which is formed at its edges to receive side flanges 21 of the rim 22. This rim supports the tread 23 which is bolted between detachable flat clamp rings 24 fitting against seats 25 of the rim 22. The rim is riveted to the shell 20 at 26.

Having thus described my invention what I claim and desire to secure by Letters Patent, is:

1. A tire armor comprising a relatively thin annular shell circumferentially fitting the surface of a tire, an exterior annular shell protecting the inner shell, the contiguous edges of said shells being rigidly secured, a substantial annular band encompassing the anterior portion of the outer shell, said shells and the band being rigidly secured, and an annular cushion tread member mounted upon the band for taking the wear, said shells protecting the tire against puncture, and being held thereon entirely by friction.

2. A tire armor comprising a relatively thin annular shell circumferentially fitting the bearing surface of a tire, an exterior annular shell protecting the inner shell, the contiguous edges of said shells being rigidly secured, a substantial annular band encompassing the anterior portion of the outer shell, said shells and the band being rigidly secured, an annular cushion member mounted upon the band for taking the wear, said shells protecting the tire against puncture, and a filler or space member interposed between and spacing said shells and being rigidly secured therewith, said tire armor being held in position by friction with the tire when the latter is inflated.

3. A tire armor comprising a relatively thin annular shell circumferentially fitting the bearing surface of a tire, an exterior annular shell protecting the inner shell, the contiguous edges of said shells meeting on the opposite sides of the tire and being rigidly secured together, a substantial annular band encompassing the anterior portion of the outer shell, said shells and the band being rigidly secured, a tread member mounted upon the band, and a space member interposed centrally between the shells and connected therewith, said tire armor being held in position by friction of the tire when said tire is inflated.

In testimony whereof I have hereunto set my hand in the presence of two subscribing witnesses.

JOHN F. GEISENDORFER.

Witnesses:
H. M. COOPER,
JOHN C. JONES.